United States Patent [19]
Andresen et al.

[11] Patent Number: 5,794,155
[45] Date of Patent: Aug. 11, 1998

[54] METHOD AND PARAMETER PREDICTION SYSTEM FOR REESTABLISHING A TEMPORARILY INTERRUPTED DYNAMIC COMMUNICATION LINK

[75] Inventors: Michael J. Andresen, Apache Junction; Keith Andrew Olds, Mesa, both of Ariz.

[73] Assignee: Motorola, Inc., Schaumburg, Ill.

[21] Appl. No.: 498,257

[22] Filed: Jul. 3, 1995

[51] Int. Cl.$^6$ ..................................... H04Q 7/20
[52] U.S. Cl. ..................... 455/517; 455/12.1; 455/10; 455/63; 455/67.1; 342/358
[58] Field of Search ................... 455/12.1, 13.1, 455/13.2, 54.1, 54.2, 52.1, 52.2, 52.3, 56.1, 427, 517, 501, 524, 67.1, 67.6, 69, 70, 68, 63, 226.1, 9, 10; 342/160, 162, 357.8, 457

[56] References Cited

U.S. PATENT DOCUMENTS

| | | | |
|---|---|---|---|
| 5,161,248 | 11/1992 | Bertiger et al. | 455/12.1 |
| 5,430,657 | 7/1995 | Kyutsos | 342/357 X |
| 5,488,640 | 1/1996 | Redden et al. | 455/13.2 X |
| 5,615,236 | 3/1997 | Turney | 455/13.2 X |

FOREIGN PATENT DOCUMENTS

| | | |
|---|---|---|
| 0578156 | 7/1993 | European Pat. Off. |
| 2277232 | 3/1993 | United Kingdom |

OTHER PUBLICATIONS

"Estimation and Prediction For Maneuvering Target Trajectories," Russell F. Berg, from IEEE, Mar. 1983.
"Optimum Steady State Position, Velocity, and Acceleration Estimation Using Noisy Sampled Position Data", by K. V. Ramachandra, IEEE, Sep. 1987.
"Estimating Optimal Tracking Filter Performance For Manned Maneuvering Targets", by Robert A. Singer, IEEE Jul. 1970.
"A Three-State Kalman Tracker Using Position And Rate Measurements", by K.V. Ramachandra, B.R. Mohan, B.R. Geetha, IEEE, Jan. 1993.
"Analytical Results For A Kalman Tracker Using Position And Rate Measurements", by K.V. Ramachandra, IEEE, Sep. 1983.
"Tracking Accuracies With Position And Rate Measurements", by Frank R. Castella, IEEE, May 1981.

*Primary Examiner*—Edward F. Urban
*Assistant Examiner*—Philip J. Sobutka
*Attorney, Agent, or Firm*—Kevin K. Johanson

[57] ABSTRACT

In a dynamic communication system (90) wherein communication parameters vary appreciably between transmissions, subscriber units (200) are susceptible to link blockages resulting in a loss of successive feedback instructing subscriber units (200) of adjustments to communication parameters to be employed in a subsequent transmission on a communication link (105). A method and system are employed to predict subsequent communication parameters and employ these predictions during link blockages in an attempt to reestablish communications and upon the removal of a link blockage, a subscriber unit (200) employs the predicted communication parameters in resuming communications without requiring complex reallocation of an additional communication link.

18 Claims, 4 Drawing Sheets

METHOD AND PARAMETER PREDICTION SYSTEM FOR REESTABLISHING A TEMPORARILY INTERRUPTED DYNAMIC COMMUNICATION LINK

TECHNICAL FIELD

This invention relates generally to telecommunications, and in particular, to established but temporarily-interrupted communication links in an dynamic telecommunication system where communication parameters such as Doppler frequency offset and propagation delay are time-variant.

BACKGROUND OF THE INVENTION

In telecommunication systems, links are established between nodes of a system for conveying information. Efficient use of these links requires enforcement of communication parameters defining when nodes at each end of a link anticipate information from the other unit. These parameters, in efficient bandwidth systems, comply with extremely tight tolerances to maximize information exchange. These parameters may include propagation delay between nodes of a network and transmit frequencies combined with any path introduced frequency error such as Doppler frequency shifts. As the communication parameters of the interfacing node become more predictable and precise, guardbands on communication channels such as frequency and timeslots can be reduced to accommodate exchange of additional information.

In conventional static or lightly dynamic telecommunication networks, these communication parameters may be refined upon the establishment of a communication link and relied upon throughout a communication session. However, in a dynamic communication system where these communication parameters are rapidly changing, communicating nodes such as subscriber units must continually refine and update these communication parameters in order to maintain the prescribed tolerances of the system.

Many systems evaluate each transmission employing dynamic communication parameters to determine the precision of the employed parameters. When the parameters exceed a threshold value as defined by system specifications such as channelized communication frequencies or timeslots, the receiving system informs the transmitting node of correction values necessary to bring the communication parameters into compliance with the system requirements.

This approach is suitable when established communication links are not susceptible to transient effects such as temporary outages due to obstructions or fleeting interference. However, in dynamic communication systems where communication parameters are short-lived, even brief outages of communication links cause communication parameters to become stale and ineffective when utilized following communication link outages. A node such as a subscriber unit that employs out-dated communication parameters will not be recognized by a receiving system due to the precise tolerances of channelized communication systems. When a subscriber unit is not recognized, the communication link will be terminated. Reestablishing a communication link is both inefficient and annoying to communication link users.

Accordingly, there is a significant need for a method and apparatus for predicting dynamic communication parameters continuously throughout a brief outage such that when the outage is terminated, a subscriber unit will have revised its dynamic communication parameters to comply with the current system dynamics. The subscriber unit may then immediately employ these revised dynamic communication parameters in subsequent transmissions to a receiving unit. The receiving unit will recognize and process the received communications since the revised communication parameters are in compliance with system parameters, thus foregoing the need to establish a subsequent communication link.

DESCRIPTION OF THE PREFERRED EMBODIMENTS

The present invention has utility in immediately resuming communication services upon interruption of a communication link between a base station and a subscriber unit in a communication system wherein the base station and the subscriber unit are dynamically oriented. In a satellite communication system, the dynamic orientation would be due to the orbiting nature of the satellite in relationship to the Earth-bound or near Earth-bound subscriber unit.

Figure 1:
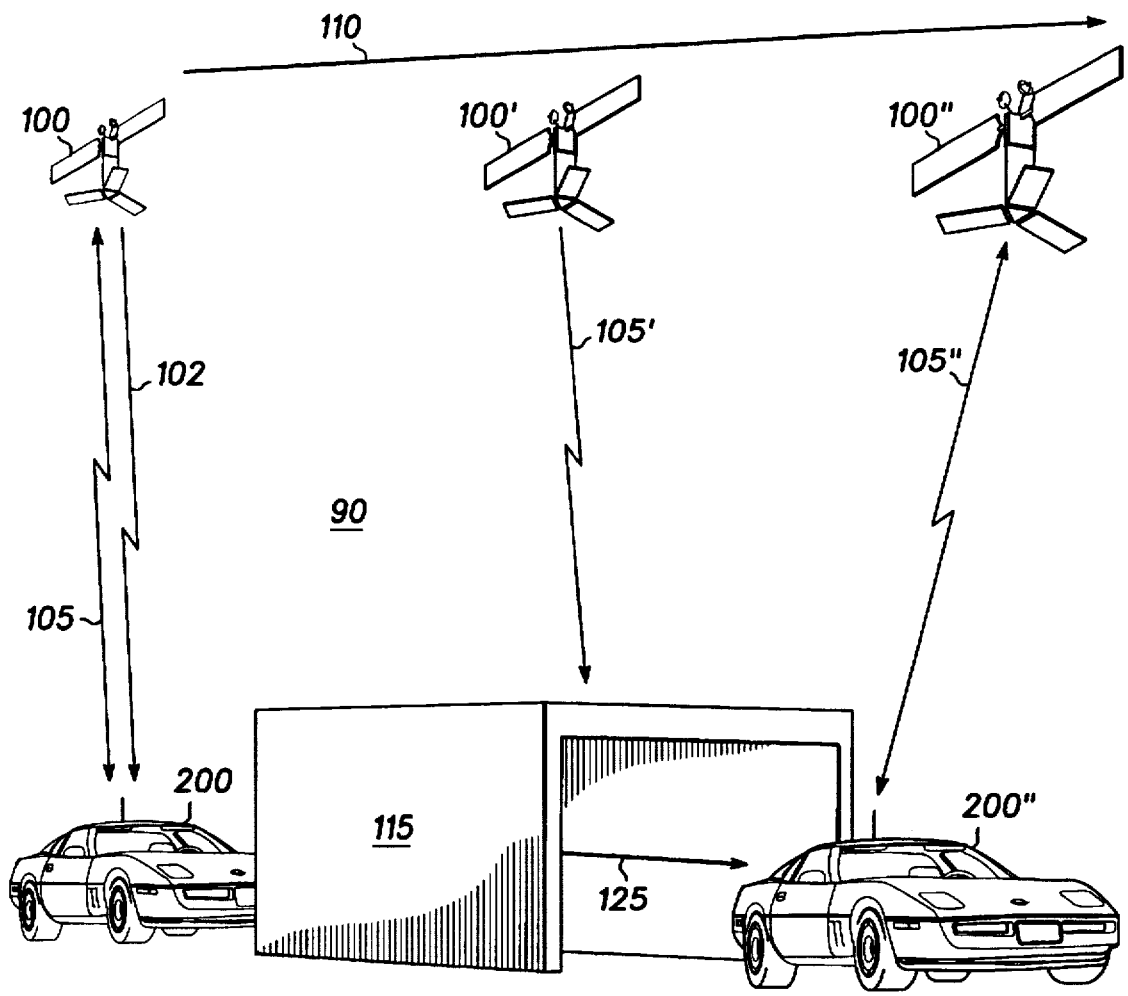
FIG. 1 depicts a highly simplified diagram of a dynamic communication system of which the present invention may form a portion thereof.

FIG. 1 depicts a highly simplified diagram of a dynamic communication system of which the present invention may form a portion thereof. A dynamic communication system 90 has components or nodes that are dynamically oriented such that distances and velocities are changing between the nodes. In FIG. 1, dynamic communication system 90 is shown as an orbiting satellite-based system where satellites 100 represent one of the communication nodes or base stations and in the preferred embodiment are space-born. It is also practical that dynamic communication system 90 could have air-born nodes or even that nodes could be Earth-bound but still in motion in relationship to other nodes. Subscriber unit 200 forms the other end of communication link 105 in dynamic communication system 90.

The motion or dynamics between nodes creates the dynamic communication parameters necessary for effective and efficient communication in an efficient system. Satellite 100 orbits the Earth in satellite orbit 110. The term "satellite" is intended to include orbiting satellites such as low-Earth orbiting (LEO) satellites, medium-Earth orbiting (MEO) satellites, or highly-inclined orbit (HIO) satellites.

Satellite 100 in satellite orbit 110 orbits the Earth at an altitude of around 780 km in a LEO system. This low-Earth orbit translates into a velocity with respect to the Earth of around 25,000 km/hr. Such a velocity allows satellite 100 to be in view of a terrestrial node such as subscriber unit 200 for a duration of only around nine minutes. This velocity creates very dynamic communication parameters such as Doppler frequency shift and propagation delay or timing.

With such a variation on communication parameters, subscriber unit 200 must frequently revise its communication parameters to comply with the system timing as expected by satellite 100.

In order to establish communication link 105, subscriber unit 200 uses default or initial communication parameters. These parameters may either be pre-programmed into subscriber unit 200 or they may be received by subscriber unit 200 on an independent broadcast channel 102. Such a channel is a broadband channel that is uni-directional from satellite 100. Broadcast channels may carry other system managing information broadcast to all subscriber units within view of satellite 100.

Figure 2:
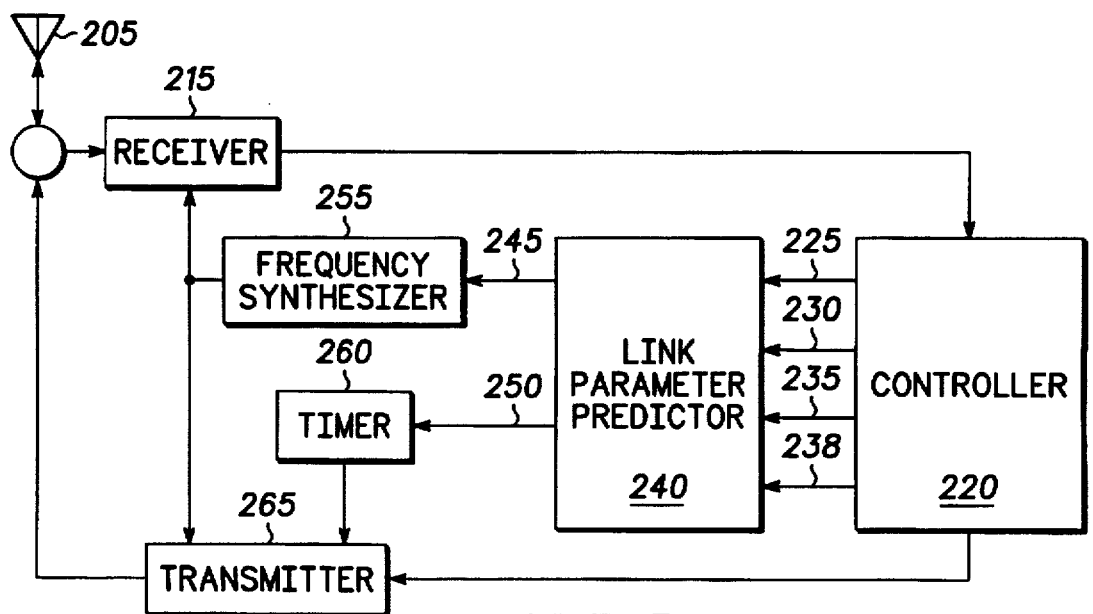
FIG. 2 depicts a block diagram of subscriber unit in a dynamic communication system of which the present invention may form a portion thereof.

Subscriber unit 200 uses default communication parameters as an approximation to actual communication parameters. This transmission to satellite 100 occurs generally on a secondary or acquisition channel having a much lower bandwidth and broader tolerances for both frequency and time variations. Satellite 100 evaluates the transmission by subscriber unit 200 which employed default communication parameters. Satellite 100, in a subsequent transmission to subscriber unit 200, returns the result of this evaluation to subscriber unit 200 in the form of feedback communication parameters denoting necessary adjustments to the default communication parameters. In the preferred embodiment, these feedback communication parameters are frequency-of-arrival (FOA) raw parameter 225 (FIG. 2) and time-of-arrival (TOA) raw parameter 230 (FIG. 2). These parameters denote a differential value of the expected frequency and timing received at satellite 100 and the actual measured values at satellite 100. Subscriber unit 200 revises the default communication parameters according to the feedback information. Subscriber unit 200 in subsequent transmissions to satellite 100 employs the revised communication parameters. This refining process repeats until dynamic communication parameters have been sufficiently refined to enable non-interfering transmission on a narrow-band channel. Satellite 100 then directs subscriber unit 200 to a traffic channel and establishment of communication link 105 is complete.

FIG. 1 also depicts satellite 100 in motion with respect to subscriber unit 200 and the potential for an outage of communication link 105. At a first point in time, satellite 100 and subscriber unit 200 are shown to have an active established communication link 105. As subscriber unit 200, traveling in subscriber unit direction of travel 125, passes by or through obstruction 115, communication link 105' experiences an outage with subscriber unit 200' (not shown). When subscriber unit 200" emerges from obstruction 115, satellite 100", in satellite orbit 110, has substantially changed its orientation in relation to subscriber unit 200". If obstruction 115 obscures communication link 105 for even a second in a narrow-band LEO satellite communication system, employment by subscriber unit 200" of the dynamic communication parameters utilized at the locations of satellite 100 and subscriber unit 200, would be out of the tolerances required by communication link 105". The need for revising and predicting dynamic communication parameters becomes apparent as subscriber unit 200 operates in an urban environment around obstructions such as buildings, highway underpasses, bridges, and dense foliage.

FIG. 2 depicts a block diagram of subscriber unit 200 in a dynamic communication system 90 (FIG. 1) of which the present invention may form a portion thereof. A receiver 215 receives, through antenna 205, broadcast channel 102 (FIG. 1) containing default communication parameters. Receiver 215 buffers all received transmissions from satellite 100, such as broadcast channel information, acquisition channel information, and information on communication link 105.

A controller 220 receives the buffered information from receiver 215. Controller 220 parses this information to extract default or feedback communication parameters from the received signal. In a preferred embodiment, dynamic communication parameters are comprised of frequency and timing or propagation parameters. Controller 220 sends FOA raw parameter 225 and TOA raw parameter 230 to a communication parameter predictor 240. Controller 220 also evaluates the status of communication link 105 (FIG. 1) and generates a link detect status 235 denoting whether an outage is underway.

During the acquisition process for establishing a communication link, raw feedback communication parameters are employed in transmissions to "pull" timing and frequency of subscriber unit transmissions into compliance with tight tolerances of the traffic channels of communication link 105. The use of raw feedback parameters allows subscriber unit 200 to quickly adjust communication parameters in gross steps as compared with finer predicted incremental values capable from the vector filter of the present invention. During this "pulling-in," controller 220 de-activates synchronization complete status 238 informing communication parameter predictor 240 to bypass vector filter 310 (FIG. 3).

Communication parameter predictor 240 receives the parameter and status signals and processes them to generate predicted frequency parameter 245 and predicted timing parameter 250. These signals inform frequency synthesizer 255 and timer 260 of the requisite transmission characteristics required to have information transmitted by transmitter 265 of subscriber unit 200 on communication link 105 received at satellite 100 during the proper channel (i.e., frequency and timeslot in a channelized system).

Figure 3:
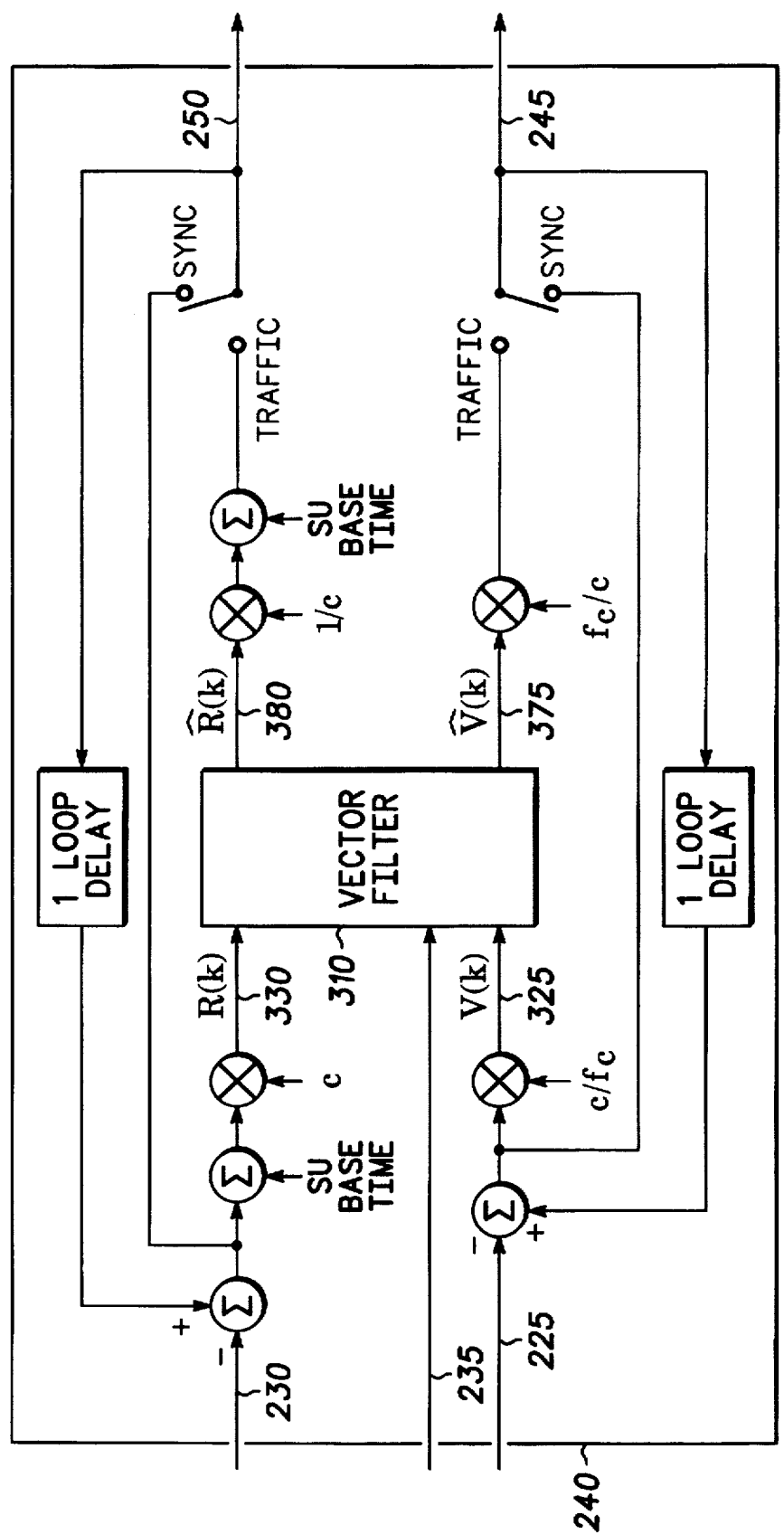
FIG. 3 depicts a block diagram of a communication parameter predictor for a subscriber unit of which the present invention may form a portion thereof.

FIG. 3 depicts a block diagram of a communication parameter predictor for a subscriber unit of which the present invention may form a portion thereof. Communication parameter predictor 240 improves the performance of subscriber unit 200 by providing a smoothing and predicting vector filter 310. Vector filter 310 acts upon range measurements (R(k)) 330 and velocity measurements (V(k)) 325 and produces smoothed estimates of the range and velocity of satellite 100 relative to subscriber unit 200.

Frequency-of-arrival raw parameter 225 and time-of-arrival raw parameter 230 are converted to range and velocity measurements in communication parameter predictor 240 for use by vector filter 310. The speed of light, c, and a subscriber unit base time defining a reference from which subscriber unit transmission and reception timing are based, are used in converting time-of-arrival parameters to and from range parameters. Smoothed and predicted range estimate 380 and predicted velocity estimate 375 are converted back to predicted frequency parameter 245 and predicted timing parameter 250 for use by frequency synthesizer 255 (FIG. 2) and timer 260 (FIG. 2).

FIG. 3 also shows the bypass switching of vector filter 310 as controlled by synchronization complete status 238 during the synchronization "pull-in" phase, as described above in FIG. 2, for establishing communication link 105 (FIG. 1). During synchronization, communication parameter predictor 240 operates with vector filter 310 out of the loop. At this point in the operation, the use of a smoothing filter is pointless. After "pull-in" is achieved and the mode is switched from sync to traffic, vector filter 310 is switched on provided sufficient raw measurements have been made to initialize the state vector of the vector filter. Initialization of vector filter 310 is discussed in FIG. 4. The structure of communication parameter predictor 240 converts TOA raw parameter 230 (FIG. 3) and FOA raw parameter 225 (FIG. 3) into a raw range parameter 330 and a raw velocity parameter 325 and both are input to vector filter 310 as a 2×3 matrix.

Figure 4:
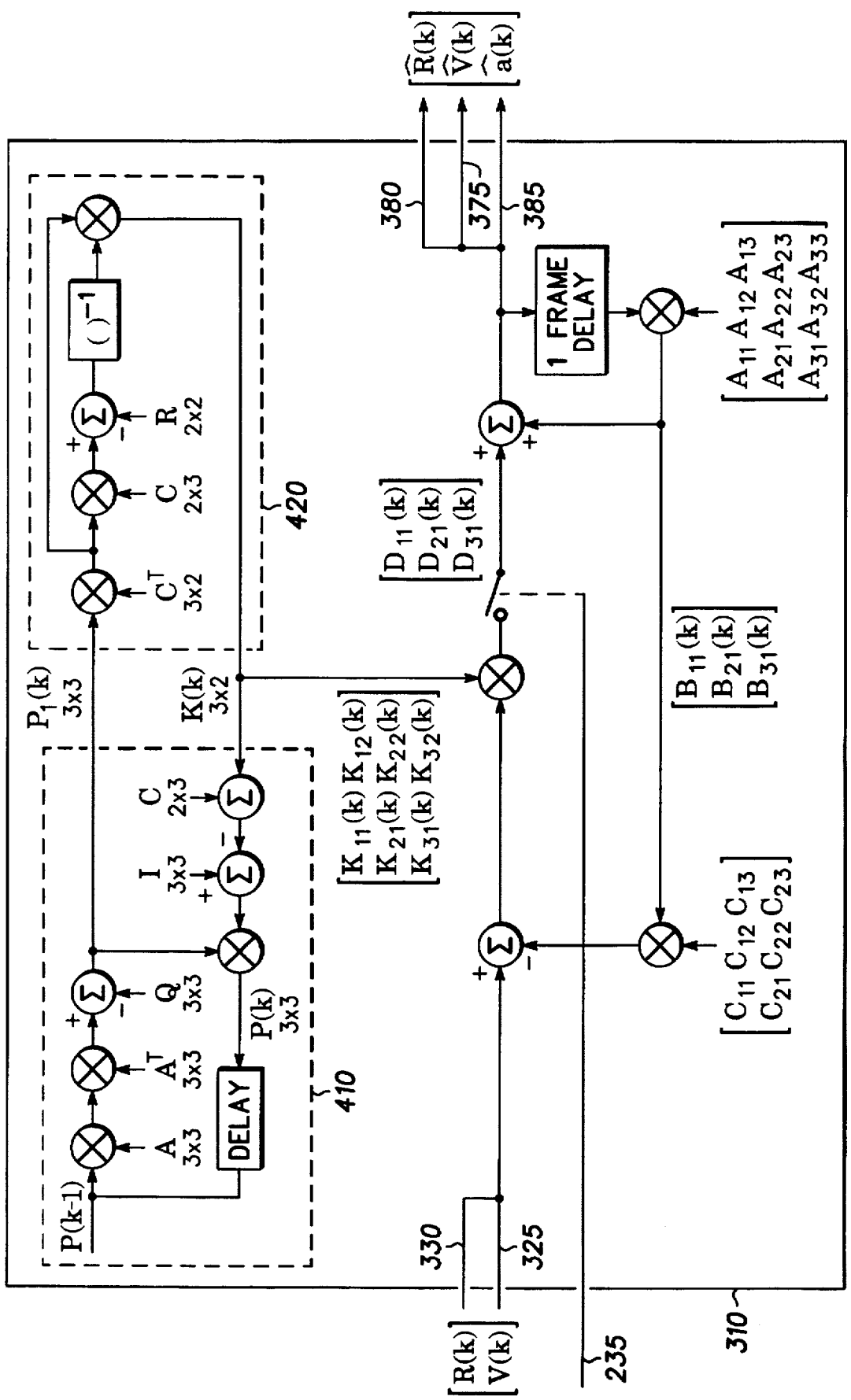
FIG. 4 depicts a block diagram of a vector filter for a communication parameter predictor of which the present invention may form a portion thereof.

FIG. 4 depicts a block diagram of a vector filter for a communication parameter predictor 240 of which the present invention may form a portion thereof. A preferred embodiment of vector filter 310 is shown as a three-state filter. Other numbers of states may be implemented for increased accuracy. In vector filter 310, acceleration is the third state and the dynamically random process is now the rate of change of acceleration. Other filters that could be considered to further improve performance would be four or more states or and extended Kalman filter.

The design of a filter requires both a model for the physical process and a model for the observation process. The physical process model is selected to incorporate as much information as possible about the relationships between range, range-rate, range-rate-rate, etc. The more sophisticated the model, the more complex the filter and the better the tracking results. The observation model is based upon the measurements available to the system and the noise process that is corrupting these measurements.

For a vector filter, the process model expressed as a first order vector dynamical equation is:

$$x(k+1) = A\ x(k) + w(k)$$

where w(k) is the physical model noise process. Its covariance matrix is defined by:

$$Q(k)\ E\{w(k)\ w^T(k)\}$$

The observation model is given by:

$$y(k) = C\ x(k) + z(k),$$

where z(k) is the measurement noise process. The measurement noise covariance matrix is defined by:

$$R(k) = E\{z(k)\ z^T(k)\}$$

The Kalman filter estimator of x(k) given its previous value, x(k–1), is given by:

$$x(k) = A\ x(k-1) + K(k)[y(k) - C\ A\ x(k-1)]$$

where the gain matrix is:

$$K(k) = P_1(k)\ C^T[CP_1(k)C^T + R(k)]^{-1}$$

where, $$P_1(k) = A\ P(k-1)\ A^T + Q(k-1)$$

$$P(k) = P_1(k) - K(k)\ C(k)\ P_1(k)$$

The discrete time difference equation for acceleration is found by expressing the acceleration at time (k+1)T as the acceleration at time kT plus T times the acceleration rate of change. Mathematically the radial acceleration, a(k) is:

$$a(k+1) = a(k) + Ta'(k)$$

where, a'(k) is the rate of change of radial acceleration at time kT. Integrating acceleration to find velocity, v(k):

$$v(k+1) = v(k) + Ta(k) + \frac{T^2}{2}\ a'(k)$$

Integrating again to find slant range, r(k):

$$r(k+1) = r(k) + Tv(k) + \frac{T^2}{2}\ a(k) + \frac{T^3}{6}\ a'(k)$$

Defining, $$x(k) = \begin{bmatrix} r(k) \\ v(k) \\ a(k) \end{bmatrix} = \begin{bmatrix} x_1(k) \\ x_2(k) \\ x_3(k) \end{bmatrix}$$

$$x_1(k+1) = x_1(k) + Tx_2(k) + \frac{T^2}{2}\ x_3(k) + \frac{T^3}{6}\ a'(k)$$

$$x_2(k+1) = x_2(k) + Tx_3(k) + \frac{T^2}{2}\ a'(k)$$

$$x_3(k+1) = x_3(k) + Ta'(k)$$

Expressed in matrix notation:

$$x(k+1) = \begin{bmatrix} 1 & T & \frac{T^2}{2} \\ 0 & 1 & T \\ 0 & 0 & 1 \end{bmatrix} x(k) + \begin{bmatrix} \frac{T^3}{6} \\ \frac{T^2}{2} \\ T \end{bmatrix} a'(k)$$

which is the first order vector equation. Hence, $$A = \begin{bmatrix} 1 & T & \frac{T^2}{2} \\ 0 & 1 & T \\ 0 & 0 & 1 \end{bmatrix} ;\ \text{and}\ w(k) = \begin{bmatrix} \frac{T^3}{6} \\ \frac{T^2}{2} \\ T \end{bmatrix} a'(k)$$

Since independent observations of range and velocity are made via the time and frequency tracking loops, respectively, the observation equation is:

$$y(k) = \begin{bmatrix} 1 & 0 & 0 \\ 0 & 1 & 0 \end{bmatrix} x(k) + z(k)$$

which defines the 2×3 C-matrix for this implementation, $$C = \begin{bmatrix} 1 & 0 & 0 \\ 0 & 1 & 0 \end{bmatrix}$$

As mentioned above, the structure of communication parameter predictor 240 converts TOA raw parameter 230 (FIG. 3) and FOA raw parameter 225 (FIG. 3) into a raw range parameter 330 and a raw velocity parameter 325 and are input to vector filter 310 as a 2×1 matrix. A feedback path is added to the input and multiplied by the 3×2 gain matrix K. The result is a 3×1 matrix denoted by D. The 3×1 matrix B is added to D to yield the output 3×1 matrix which is the smoothed estimate of range, velocity and acceleration. The B and D matrices are storage medium and do not appear directly in the vector filter equations.

Communication parameter predictor 240 and its inclusive vector filter 310 must operate through periods of time when no data is available for input but an updated estimate is still needed for the tracking loop. This occurs routinely when coasting in-between maintenance bursts containing feedback communication parameters or sporadically when communication link 105 blockages occur. The availability of a measurement can be determined by link detect status 235. When available, vector filter 310 operates closed loop and all covariance matrices are updated. When no data is available, the feedback tap from the loop gain matrix is opened, the gain matrix and covariance matrices are not updated, and the estimate is formed from only the geometric matrix A and the previous state estimate matrix.

Since the state variables are updated at the frame rate and the gain and covariance matrices are updated at the maintenance schedule rate which is every fourth frame in the preferred embodiment, two A matrices must be maintained. The matrix for the state variable calculations is designated as A1 and is given by:

$$A1 = \begin{bmatrix} 1 & T_1 & T_1^2/2 \\ 0 & 1 & T_1 \\ 0 & 0 & 1 \end{bmatrix}$$

The matrix for the gain and covariance matrix calculations is computed for a four frame interval. It is designated as matrix A4 and is given by:

$$A4 = \begin{bmatrix} 1 & T_4 & T_4^2/2 \\ 0 & 1 & T_4 \\ 0 & 0 & 1 \end{bmatrix}$$

Gain Matrix and Error Covariance Matrix Computation

The procedure for computing the error covariance matrices, P and P1, of an error covariance matrix computation block 410 is discussed below. The first time the loop is executed, an initial value for the P matrix, P(0), must be available. The initialization values used are discussed in a later section. From this, P1(1) is computed. The gain matrix, K(1), of a gain matrix computation block 420 is then computed and used in the filter loop of vector filter 310 to update the state variable estimates. The gain matrix is also used to update the P matrix, P(1), which is stored until the next time the loop is executed.

Upon subsequent executions of the loop, the previous value of the P(k) is used in the P1(k) and K(k) computation rather than the initial value matrix. However, if it is determined by subscriber unit 200 that a link outage has occurred then the P matrix will be set back to P(0). This allows reinitialization of the error variances back to their initial values and increases the loop gain to facilitate rapid reacquisition of the uplink from subscriber unit 200 to satellite 100.

Subscriber unit 200 should also reset the state vector to initial values after a link outage. Initial values are determined by feedback communication parameters after communication link 105 is reestablished.

A simplification of the P matrix computation is shown implemented in error covariance matrix computation block 410 and is defined by substituting the values for the C matrix and factoring $P_1$ from the equation:

$$\begin{aligned} P(k) &= P_1(k) - K(k)C(k)P_1(k) \\ &= |I - K(k)C(k)|P_1(k) \\ &= \begin{bmatrix} 1-K_{11}(k) & K_{12}(k) & 0 \\ K_{21}(k) & 1-K_{22}(k) & 0 \\ K_{31}(k) & K_{32}(k) & 1 \end{bmatrix} P_1(k) \end{aligned}$$

As the P matrix is iterated over and over again, its entries will stabilize to their steady state values. The entries in the P matrix change from their initial error variances of the estimates to their final values.

A gain matrix computation block 420 is shown in FIG. 4. The K matrix is computed from the P1 matrix and the other constants C and R. The dimensionality of each matrix used in the computation is also shown. Note that even though a 3-state filter is implemented in the preferred embodiment, the inverse function acts on only a 2×2 matrix. As vector filter 310 is iterated the filter gains approach their steady state values.

Measurement Noise Covariance Matrix

The measurement noise, z(k), is defined as:

$$z(k) = \begin{bmatrix} z_1(k) \\ z_2(k) \end{bmatrix} = \begin{bmatrix} \text{Range Measurement Noise} \\ \text{Velocity Measurement Noise} \end{bmatrix}$$

The range and velocity measurements are derived directly from the TOA raw parameter 230 (FIG. 3) and FOA raw parameter 225 (FIG. 3) respectively. Since the variances of TOA raw parameter 230 and FOA raw parameter 225 are known, the range and velocity variances can be determined. The measurement processes are mean zero (i.e., no bias error), and hence the variance=$E\{z_i^2(k)\}$ which is what is needed to define terms in the R matrix.

In the preferred embodiment, FOA raw parameter 225 standard deviation is:

$$s_f = 31.97 \text{ Hz at } 4.1 \text{ dB Eb/No}$$

Hence, $$s_v = s_f \frac{c}{f_c} = 31.97 \; \frac{3 \times 10^8}{1625 \times 10^6} = 5.9 \text{ m/s}$$

and, $$s_v^2 = 34.84 \text{ m}^2/\text{s}^2$$

Likewise, TOA raw parameter 230 standard deviation is:

$$s_t = 0.0028 \text{ ms at } 4.1 \text{ dB Eb/No}$$

Hence, $$s_r = c \; s_t = 3 \times 10^8 \times 0.0028 \times 10^{-3} = 840.0 \text{ m}$$

and, $$s_r^2 = 705{,}600 \text{ m}^2$$

As for the off diagonal terms, these terms are the cross-correlations between the range and velocity measurements. These measurement errors are considered uncorrelated for the following reasons:

(i) Under static conditions, TOA raw parameter 230 is a more robust measurement than FOA raw parameter 225. It has a very small standard deviation over it's operating signal-to-noise ratio where FOA raw parameter 225 has a much broader range;

(ii) Under real orbital conditions, TOA raw parameter 230 and FOA raw parameter 225 processes are not stressed at the same time. TOA raw parameter 230 has large error values at low elevation angles where radial velocity is maximum and acceleration is minimum, and FOA raw parameter 225 has large error values at high elevation angles where radial acceleration is maximum and velocity is minimum; and (iii) Under link blockage or fading conditions, no FOA raw parameter 225 and TOA raw parameter 230 updates are made to vector filter 310 (or the tracking loop for that matter) so correlated error under this condition is not a consideration.

The R matrix for this filter implementation is:

$$R(k) = E\{z(k)z^T(k)\}$$

$$= \begin{bmatrix} E\{z_1^2(k)\} & E\{z_1(k)z_2(k)\} \\ E\{z_2(k)z_1(k)\} & E\{z_2^2(k)\} \end{bmatrix}$$

Process Noise Covariance Matrix

Filter development relies on the modeling of radial acceleration. The true behavior of the acceleration is that it is near zero when satellite 100 is viewed at low elevation angle and is some maximum negative value at zenith, satellite 100 has slowed down relative to subscriber unit 200. The magnitude of the acceleration then reduces back to zero as the elevation angle decreases back to zero. Non-overhead passes have a similar profile without the maximum acceleration magnitude being reached. The acceleration from one transmission from subscriber unit 200 to the next will have significant correlation as the acceleration is a slow varying process. However, vehicular motion of subscriber unit 200 may introduce other extraneous accelerations which may reduce the correlation from transmission to transmission.

In the preferred embodiment, the acceleration rate-of-change is characterized with values of $\pm 0.5$ m/s$^3$ for the overhead pass and $\pm 0.3$ m/s$^3$ for the side pass utilized. Maximum acceleration occurs when satellite 100 is directly overhead of subscriber unit 200. In the preferred embodiment, the acceleration rate of change is maximum about a minute before and after satellite 100 is directly overhead subscriber unit 200 and has a magnitude of about 0.5 m/s$^3$. This corresponds to about a 70° elevation angle.

A histogram, Pa'(a'), of the acceleration rate-of-change may be constructed to evaluate the variance of the process.

$$E\{a'(k)a'(k)\} = \int_{-\infty}^{\infty} a'^2 p_{a'}(a')da' = 0.053 \text{ m}^2/\text{s}^3$$

Knowing the acceleration rate-of-change variance in the preferred embodiment, the covariance matrix can now be evaluated.

$$Q(k) = E\{w(k)w^T(k)\}$$

$$= E\left\{ \begin{bmatrix} T^3/6 \\ T^2/2 \\ T \end{bmatrix} a'(k) \, [T^3/6 \; T^2/2 \; T]a'(k) \right\}$$

$$= \begin{bmatrix} T^6/36 & T^5/12 & T^4/6 \\ T^5/12 & T^4/4 & T^3/2 \\ T^4/6 & T^3/2 & T^2 \end{bmatrix} E\{a'(k)a'(k)\}$$

setting T=0.36 sec (the feedback parameter loop update rate of the preferred embodiment) and using the result for the expected value of a'$^2$, the Q matrix has a value of:

$$Q(k) = \begin{bmatrix} 3.51e-6 & 2.67e-5 & 1.48e-4 \\ 2.70e-5 & 2.23e-4 & 1.24e-3 \\ 1.48e-4 & 1.24e-3 & 6.87e-3 \end{bmatrix}$$

Filter Initialization

Initial values are needed for the filter state variables (r(0), v(0) and a(0)) and the 3×3 prediction mean square error matrix P(0).

The state variables r(0) and v(0) are initialized by the range and velocity estimates determined during when subscriber unit 200 is performing a synchronization mode while it is "pulling in" to meet the criterion of communication parameters for communication link 105. a(0) is initialized by differencing two velocity measurements; [v(1)–v(0)]/T. Note that to initialize a(k), two measurements are needed. Since communication link 105 is now operating in Traffic mode and hence, in the preferred embodiment, these measurements are about 0.36 sec apart. In subscriber unit 200, tracking loops will run without vector filter 310 until these measurements are available to the filter.

The mean square error matrix P(k) should be initialized by the variance of the initial state measurements. The P(0) matrix is given by:

$$P(0) = \begin{bmatrix} E\{r \cdot r\} & E\{r \cdot v\} & E\{r \cdot a\} \\ E\{v \cdot r\} & E\{v \cdot v\} & E\{v \cdot a\} \\ E\{a \cdot r\} & E\{a \cdot v\} & E\{a \cdot a\} \end{bmatrix}$$

where, $E\{r \cdot r\} = s_r^2$ $E\{r \cdot v\} = E\{v \cdot r\} = 0$ $E\{r \cdot a\} = E\{a \cdot r\} = 0$ $E\{v \cdot v\} = s_v^2$ $$E\{v \cdot a\} = E\{a \cdot v\} = E\left\{ \frac{v_1 - v_0}{T} v_1 \right\} = \frac{s_v^2}{T}$$

and, $$E\{a \cdot a\} = E\left\{ \frac{v_1 - v_0}{T} \frac{v_1 - v_0}{T} \right\} = \frac{2s_v^2}{T^2}$$

Updating the matrix:

$$P(0) = \begin{bmatrix} s_r^2 & 0 & 0 \\ 0 & s_v^2 & \dfrac{s_v^2}{T} \\ 0 & \dfrac{s_v^2}{T} & \dfrac{2s_v^2}{T^2} \end{bmatrix}$$

Substituting the values given in the last section for $s_r^2$ and $s_v^2$ and using T=0.36 sec since the initial values are calculated over a four frame interval, the initial value, in the preferred embodiment, for the error covariance matrix is:

$$P(0) = \begin{bmatrix} 705600 & 0 & 0 \\ 0 & 34.84 & 96.78 \\ 0 & 96.78 & 537.65 \end{bmatrix}$$

Figure 5:
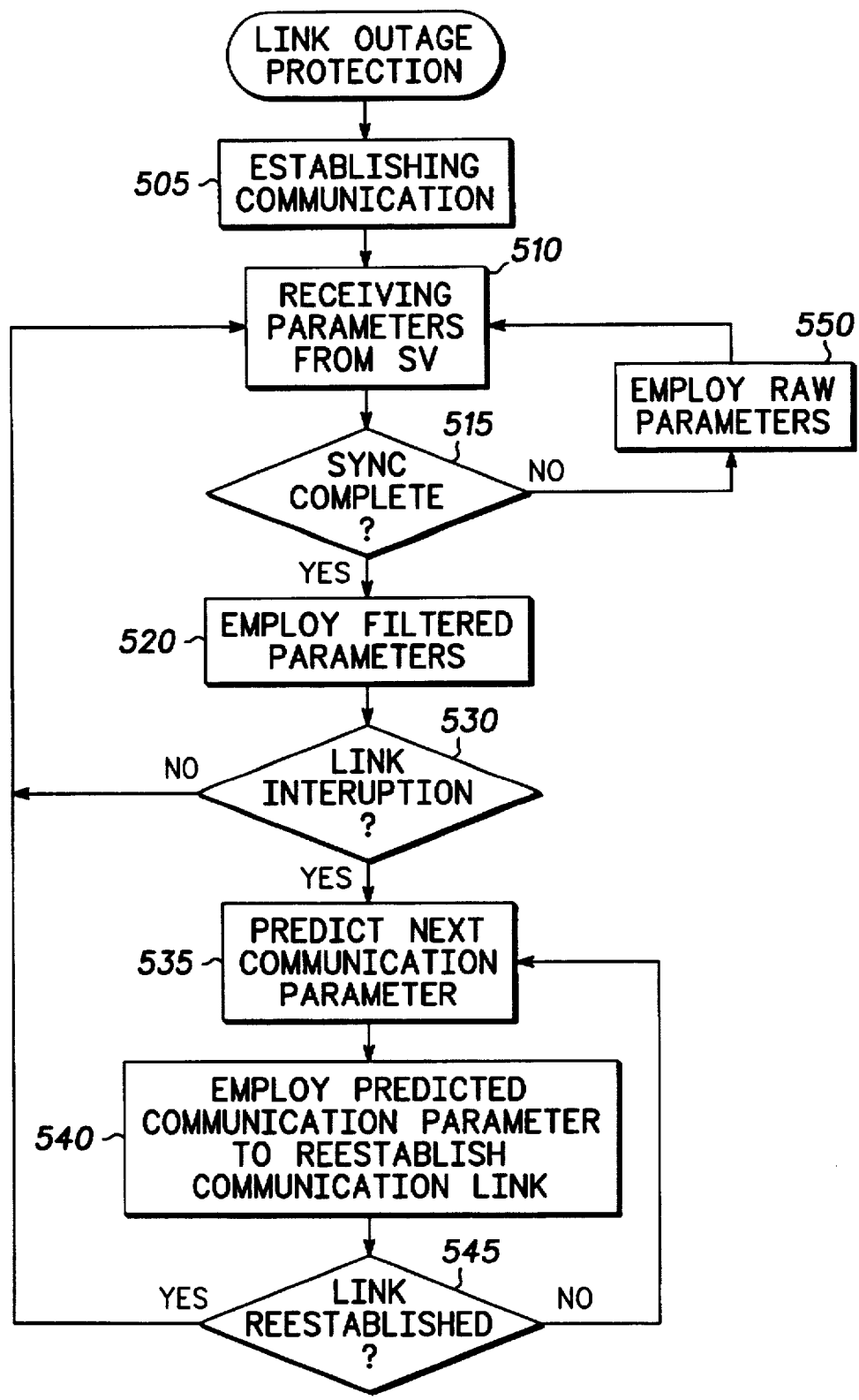
FIG. 5 shows a flowchart for predicting dynamic communication parameters in a dynamic communication system, in accordance with a preferred embodiment of the present invention.

FIG. 5 shows a flowchart for predicting dynamic communication parameters in a dynamic communication system, in accordance with a preferred embodiment of the present invention. In the preferred embodiment, subscriber unit 200 performs link outage protection procedure as shown.

In a task 505, subscriber unit 200 initiates the establishment of communications with satellite 100 by initiating communications as directed by a user of subscriber unit 200 either in response to notification that an incoming call is pending or as initiated by the user.

A task 510 then receives feedback communication parameters from satellite 100 either from an independent broadcast channel or in a maintenance portion of communication link 105. These feedback communication parameters, in the preferred embodiment, comprise frequency and timing variances associated with transmission of data from subscriber unit 200 to satellite 100 as evaluated by satellite 100.

A query task 515 then evaluates if synchronization is completed. Synchronization is complete when communication parameters are sufficiently accurate that satellite 100 permits subscriber unit 200 to communicate on a tighter-tolerance traffic channel. Also, synchronization is complete, in the preferred embodiment, when the matrices of vector filter 310 are initialized.

A task 550 proceeds when the learning or synchronization of query task 515 is not complete. In task 550, the feedback or raw parameters of communication link 105 are employed for communicating with satellite 100. These feedback parameters provide larger "pull-in" increments while coarse adjustment of communication parameters is underway.

When synchronization is completed, a task 520 utilizes the communication parameters emerging from vector filter 310. These parameters more incrementally continuous and provide a smoothing effect to communication parameters employed on communication link 105. This smoothing provides a collateral benefit to communication link 105 in that vector filter 310 tracks variations in communication parameters and anticipates future changes to these parameters. This anticipation and employment of these anticipated communication parameters reduces the frequency of transmission of feedback parameters on communication link 105.

A query task 530 evaluates communication link 105 to determine if the link remains intact or if an outage has occurred due to link blockage. If link interruption has not occurred, then processing returns to task 510 to listen for any subsequent transmissions of feedback parameters to be incorporated into future predictions of communication parameters.

When an link outage is detected, a task 535 predicts future communication parameters for use in communication link 105. These parameters are generated when link detect status 235 disables the input path and vector filter 310 cycles producing predictions of communication parameters.

A task 540 then employs these predicted communication parameters by attempting to transmit to satellite 100 using these predicted communication parameters. These predicted parameters roughly track the actual communication parameters necessary to reestablish communications.

A query task 545 then reevaluates communication link 105 to determine if the link blockage has ceased. If the link has not been successfully reestablished, then processing returns to task 535 for a subsequent prediction of the communication parameters presently necessary to attempt a successive reestablishment of communication link 105. This iterative prediction of subsequent parameters may continue indefinitely until the link is recovered or may be terminated after a predetermined number of attempts. Because the prediction of subsequent communication parameters has inherent error which Depends on the number of stages utilized in vector filter 310, the prediction of communication parameters will drift from actual necessary values for the reestablishment of communication link 105. A predetermined timeout or an automatic re-initiation of communications as described in task 505 may be employed.

If reestablishment of communication link 105 is detected in query task 545, then processing passes back to task 510 for reception of feedback communication parameters and reinitialization of vector filter 310.

The present invention has utility in maintaining synchronization with a satellite and a subscriber unit during link blockages such as those due to highway bridges, tunnels, or blocking structures. It is also applicable to airborne uses who experience link outages from wing, tail, or other control surfaces blocking a communication link.

The present invention has been described above with reference to a preferred embodiment. However, those skilled in the art will recognize that changes and modifications may be made in this preferred embodiment without departing from the scope of the present invention.

What is claimed is:

1. A method of resuming communication services upon an interruption of a communication link between a base station and a subscriber unit in a communication system wherein said base station and said subscriber unit are dynamically oriented, said method comprising the steps of:

establishing said communication link between said base station and said subscriber unit using dynamic communication parameters;

transmitting from said subscriber unit to said base station on said communication link using said dynamic communication parameters;

evaluating at said base station an accuracy of said dynamic communication parameters employed by said subscriber unit;

when said accuracy of said dynamic communication parameters exceeds a tolerance for said dynamic communication parameters, transmitting feedback communication parameters denoting adjustments to said dynamic communication parameters to said subscriber unit;

receiving from said base station said feedback communication parameters;

when said feedback communication parameters are received by said subscriber unit, filtering previous ones of said dynamic communication parameters with a present one of said feedback communication parameters;

13 when said feedback communication parameters are not received by said subscriber unit because said accuracy of said dynamic communication parameters does not exceed said tolerance for said dynamic communication parameters, filtering previous ones of said dynamic communication parameters;

said subscriber unit producing filtered communication parameters from said filtering step, said filtered communication parameters being incrementally more continuous than said feedback communication parameters;

said subscriber unit utilizing said filtered communication parameters as said dynamic communication parameters for use in subsequent transmissions;

upon an interruption of said communication link, said subscriber unit predicting current dynamic communication parameters for use between said base station and said subscriber unit; and upon termination of said interruption of said communication link, said subscriber unit employing said current dynamic communication parameters for restoring said communication link between said base station and said subscriber unit.

2. A method as recited in claim 1 wherein prior to the step of establishing said communication link, said method further comprises the steps of:

communicating initial values of said dynamic communication parameters in a broadcast channel from said base station to said subscriber unit; and said subscriber unit employing said initial values of said dynamic communication parameters in said establishing step.

3. A method as recited in claim 1 wherein said filtering step is performed by a Kalman-type filter.

4. A method as recited in claim 1 wherein said base station is an orbiting satellite.

5. A method as recited in claim 1 wherein said predicting step further comprises the steps of:

filtering previous ones of said dynamic communication parameters; and predicting current dynamic communication parameters.

6. A method as recited in claim 5 further comprising the step of attempting to reestablish said communication link using said current dynamic communication parameters as said dynamic communication parameters.

7. A method as recited in claim 5 wherein said filtering step is performed by a Kalman-type filter.

8. A method as recited in claim 1 wherein said dynamic communication parameters comprise a Doppler frequency offset between said base station and said subscriber unit.

9. A method as recited in claim 8 wherein said dynamic communication parameters further comprise propagation delay between said base station and said subscriber unit.

10. A method of resuming communication services in a subscriber unit upon an interruption of a communication link between a base station and said subscriber unit in a communication system wherein said base station and said subscriber unit are dynamically oriented, said method comprising the steps of:

said subscriber unit establishing said communication link with said base station using dynamic communication parameters;

14 said base station transmitting to said subscriber unit feedback parameters denoting adjustments to said communication parameters;

when said feedback communication parameters are received by said subscriber unit, filtering previous ones of said dynamic communication parameters with a present one of said feedback communication parameters;

when said feedback communication parameters are not received by said subscriber unit because said dynamic communication parameters does not exceed a tolerance for said dynamic communication parameters, filtering previous ones of said dynamic communication parameters;

said subscriber unit producing filtered communication parameters from said filtering step, said filtered communication parameters being incrementally more continuous than said feedback communication parameters;

said subscriber unit utilizing said filtered communication parameters as said dynamic communication parameters;

upon interruption of said communication link, said subscriber unit predicting current dynamic communication parameters for use between said base station and said subscriber unit; and upon termination of said interruption of said communication link, said subscriber unit employing said current dynamic communication parameters for restoring said communication link between said base station and said subscriber unit.

11. A method as recited in claim 10, wherein prior to the step of establishing said communication link, said method further comprises the steps of:

receiving initial values of said dynamic communication parameters at said subscriber unit; and employing said initial values of said dynamic communication parameters in said establishing step.

12. A method as recited in claim 10, wherein said filtering step is performed by a Kalman-type filter.

13. A method as recited in claim 10 wherein said dynamic communication parameters comprise a Doppler frequency offset between said base station and said subscriber unit.

14. A method as recited in claim 10 wherein said dynamic communication parameters further comprise propagation delay between said base station and said subscriber unit.

15. A method as recited in claim 10 wherein said base station is an orbiting satellite.

16. A method as recited in claim 10, wherein said predicting step further comprises the steps of:

filtering previous ones of said dynamic communication parameters; and predicting current dynamic communication parameters.

17. A method as recited in claim 16 further comprising the step of attempting to reestablish said communication link using said current dynamic communication parameter as said dynamic communication parameters.

18. A method as recited in claim 16 wherein said filtering step is performed by a Kalman-type filter.

* * * * *